United States Patent
Chang Chien

(10) Patent No.: US 6,595,121 B1
(45) Date of Patent: Jul. 22, 2003

(54) FRUIT AND VEGETABLE PROCESSOR

(75) Inventor: Sung-Shan Chang Chien, Kaohsiung Hsien (TW)

(73) Assignee: Ken Ying Enterprise Co., Ltd., Kaohsiung Hsien (TW)

( * ) Notice: Subject to any disclaimer, the term of this patent is extended or adjusted under 35 U.S.C. 154(b) by 0 days.

(21) Appl. No.: 10/314,301

(22) Filed: Dec. 9, 2002

(51) Int. Cl.⁷ .............................. A23L 1/00; A23N 1/00; A47J 43/06; A47J 43/07; B02C 19/12

(52) U.S. Cl. .............................. 99/510; 99/348; 99/492; 99/509; 241/199.12; 241/282.2; 366/205; 366/314

(58) Field of Search .......................... 99/348, 509–513, 99/495, 485, 467, 492; 366/205, 206, 96–98, 197, 199, 314, 315, 342, 343, 307, 309; 241/282.1, 282.2, 282.5, 292.1, 97, 98, 199.12, 46.17, 37.5, 92, 285.1, 285.2; 403/300, 206; D7/378

(56) References Cited

U.S. PATENT DOCUMENTS

| | | | | |
|---|---|---|---|---|
| 3,892,365 A | * | 7/1975 | Verdun | 241/92 |
| 4,081,144 A | * | 3/1978 | Bouillet | 241/37.5 |
| 4,362,277 A | * | 12/1982 | Amiot | 241/282.2 X |
| 4,609,156 A | * | 9/1986 | Boele | 241/199.12 |
| 4,878,627 A | * | 11/1989 | Otto | 99/348 X |
| 4,887,909 A | * | 12/1989 | Bennett | 366/205 X |
| 5,236,135 A | * | 8/1993 | Wilson et al. | 99/510 X |
| 5,240,187 A | * | 8/1993 | Wilson | 99/510 X |
| 5,405,096 A | * | 4/1995 | Seol | 99/511 X |
| 6,082,648 A | * | 7/2000 | Marriere et al. | 241/282.1 |
| 6,189,441 B1 | * | 2/2001 | Beaudet et al. | 99/492 |
| 6,298,776 B1 | * | 10/2001 | Ekstrom | 99/509 |
| 6,299,085 B1 | * | 10/2001 | Ekstrom | 99/510 X |

* cited by examiner

Primary Examiner—Timothy F. Simone
(74) Attorney, Agent, or Firm—Leong C. Lei

(57) ABSTRACT

A fruit and vegetable processor is disclosed. The bottom plate of the cup body is provided with a plurality of spaced apart through holes and the lower section of the through holes is formed into a hollow passage for the insertion of a plugging element into the passage. One end of the passage is protruded out of the lateral side of the cup body for the insertion of a blocking tube to the passage such that the through hole is sealed, preventing the downward dripping of juice from the cup body, or a delivery tube having a filter is inserted to the passage so that the juice from the cup body after filtering and is then discharged via the delivery tube such that a single cup is provided with two usages.

3 Claims, 5 Drawing Sheets

FRUIT AND VEGETABLE PROCESSOR

BACKGROUND OF THE INVENTION (a) Technical Field of the Invention

The present invention relates to food processor, and in particular, a fruit and vegetable processor having a slanting bottom plate to allow juice within the cup body of the processor to flow through a delivery tube.

(b) Description of the Prior Art

Conventional fruit and vegetable processors are of two types. As shown in FIG. 1, a conventional processor 1 having a base seat 11 mounted with a cup body 12. The opening at the top of the cup body 12 is provided with a cap 13 to seal the cup body and the inner section of the base seat 11 is provided with a motor having a shaft which can drive a tool kit 14 to rotate. The bottom plate of the cup body 12 is provided with a plurality of spaced apart blocks 15. When the top cap 13 is opened to place vegetable or fruits, the control button 15 is then pressed and the tool kit 14 starts to rotate. The blocks 15 prevent the food stuff to rotate simultaneously with the tool kit 14 so that the food stuff is minced to liquid state. This type of tool kit 14 is wide and the liquid thus produced can be drunk directly or filtered prior to drinking.

Referring to FIG. 2, the processor 2 is used for beans or the like where the residues are large. The base seat 21 is mounted with a cup body 22 and the internal of the base seat 21 is provided with a motor. The shaft of the motor is in combination with the tool kit 23 at the bottom section of the cup body 22. The tool kit 23 is short and the outer hood of the tool kit 23 is provided with a filter pump 24 having an opening. The center of the top cover 25 of the cup body 22 is provided with a through hole being inserted with a feeding tube 26. The lower end of the feeding tube 26 is inserted into the opening of the filter pump 24, and feeding of beans into the processor 2 can be accomplished via the feeding tube 26. By pressing the control button 27 at the base seat 21 the motor drives the tool kit 23 to rotate and the beans are minced to liquid state. The residues are filtered off and retained at the filter pump 24 and the filtrate flows to the space between the cup body 22 and the filter pump 24. The cup body 22 has to be dismantled from the base seat 21 and the liquid has to pour out.

The above processors have drawbacks with respect to filtering of the filtrate and the retention of residues. The cup body in these processors has to be washed every time the processor is used. Thus, it is an object of the present invention to provide a fruit and vegetable processor which can mitigate the above drawbacks.

SUMMARY OF THE INVENTION

Accordingly, it is an object of the present invention to provide a fruit and vegetable processor having a base seat mounted with a cup body, a motor being installed within the base seat and the lower side of the interior of the cup body being axially mounted with a tool kit driven by the motor to rotate and stir and mince food stuff, the top side of the cup body being an opening covered with a top cover, and the bottom plate of the cup body inclined at one side, characterized in that the lower side of the bottom plate is provided with a plurality of spaced apart through holes and the lower section of the through holes is formed into a hollow passage for the insertion of a plugging element into the passage.

Yet another object of the present invention is to provide a fruit and vegetable processor, wherein The bottom plate of the cup body is provided with a plurality of spaced apart through holes and the lower section of the through holes is formed into a hollow passage for the insertion of a plugging element into the passage. One end of the passage is protruded out of the lateral side of the cup body for the insertion of a blocking tube to the passage such that the through hole is sealed, preventing the downward dripping of juice from the cup body, or a delivery tube having a filter is inserted to the passage so that the juice from the cup body after filtering and is then discharged via the delivery tube such that a single cup is provided with two usages.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 5:
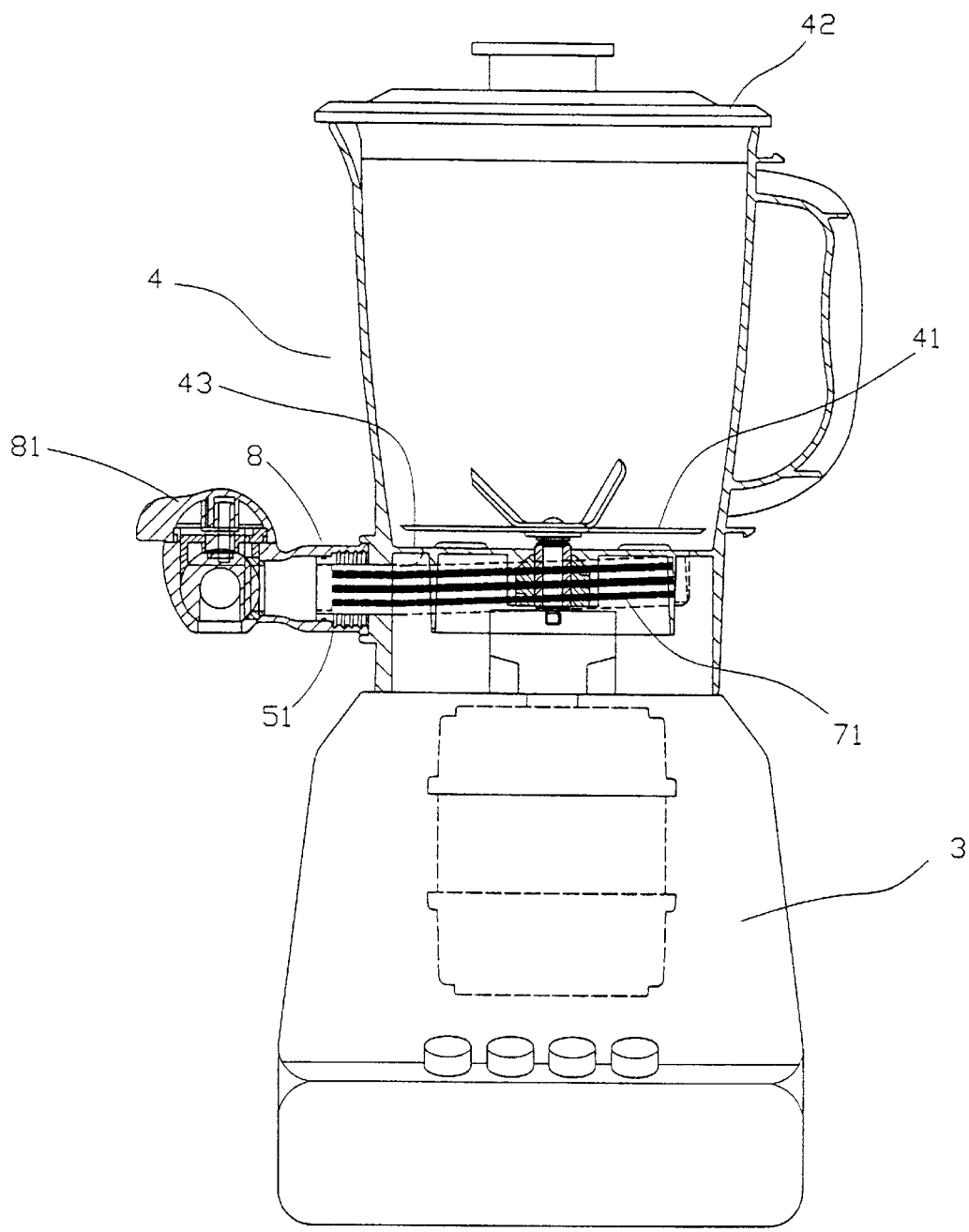
FIG. 5 is a sectional view of the present invention.

Referring to FIG. 5, there is shown a fruit and vegetable processor having a base seat 3 mounted with a cup body 4. A motor 3 is mounted within the base seat 3. The bottom side of the interior of the cup body is axially mounted with a tool kit 41 which is driven by the motor so as to stir and mince fruit and vegetable. The solid food stuff within the cup body 4 is minced to become liquid state. The top side of the cup body 4 is provided with an opening mounted with a top cover 42 such that the cup body is a sealed when the processor is operated.

Figure 1:
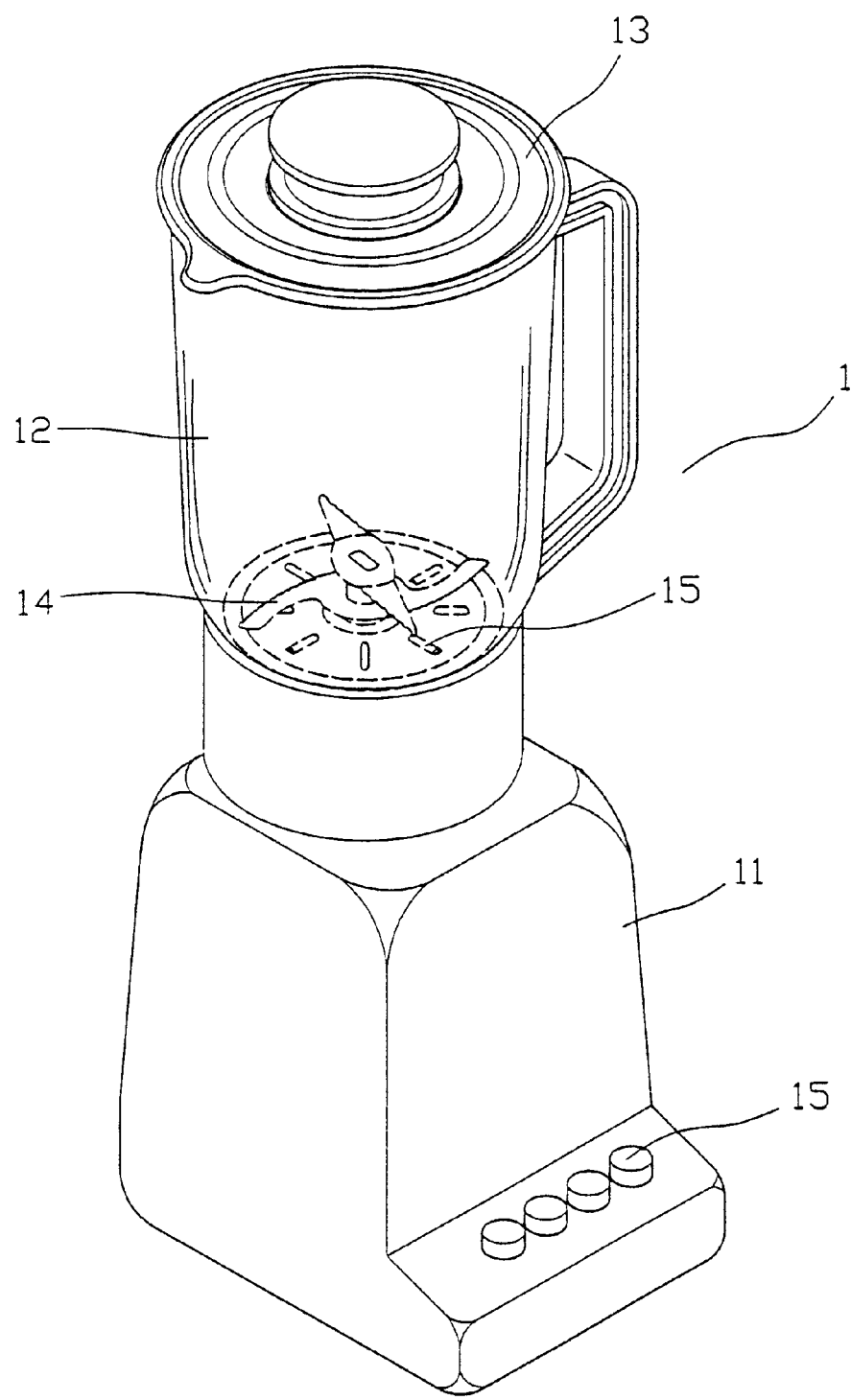
FIG. 1 is a perspective view of a conventional fruit and vegetable processor.
Figure 2:
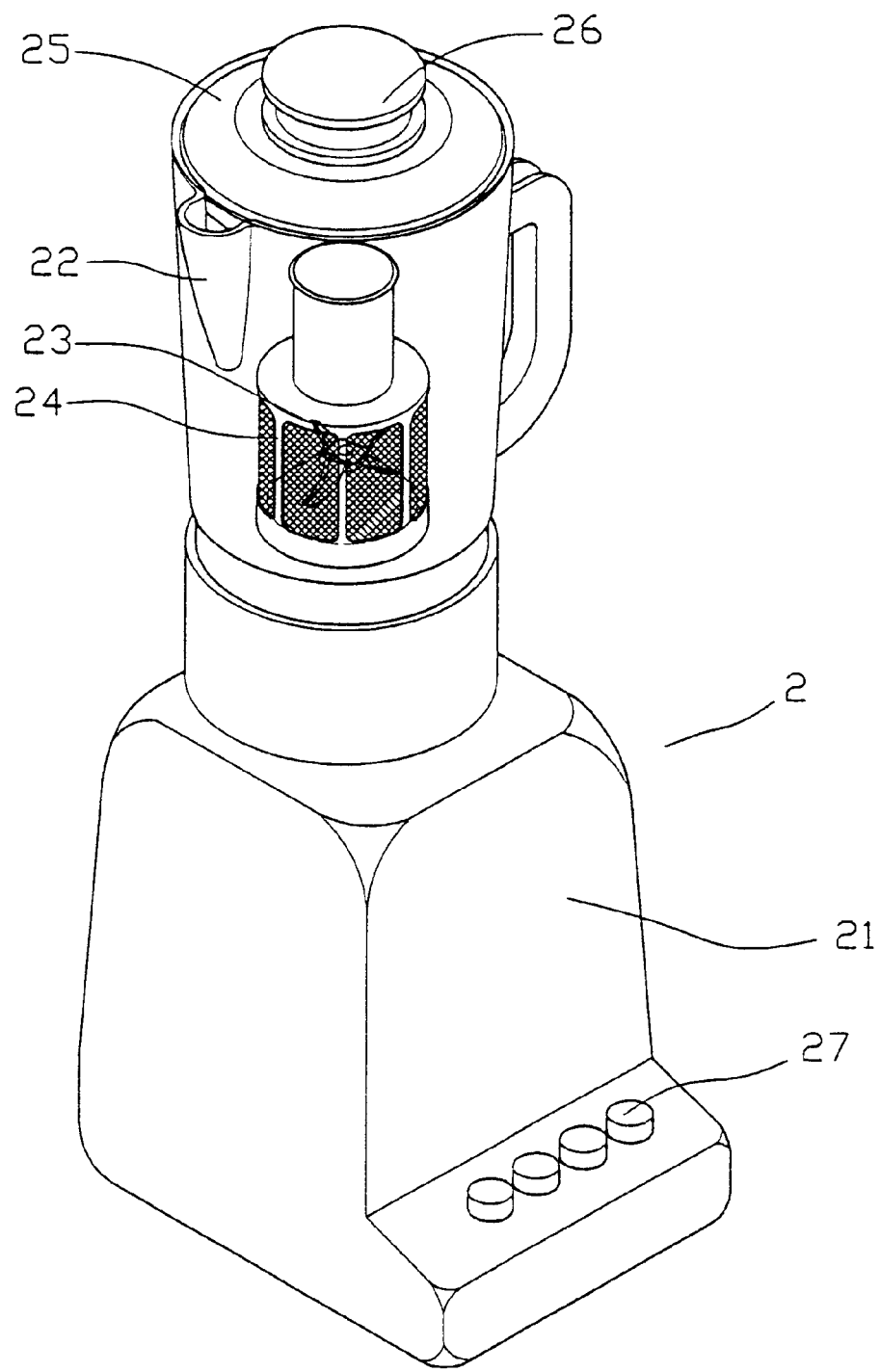
FIG. 2 is a perspective view of another conventional fruit and vegetable processor.
Figure 3:
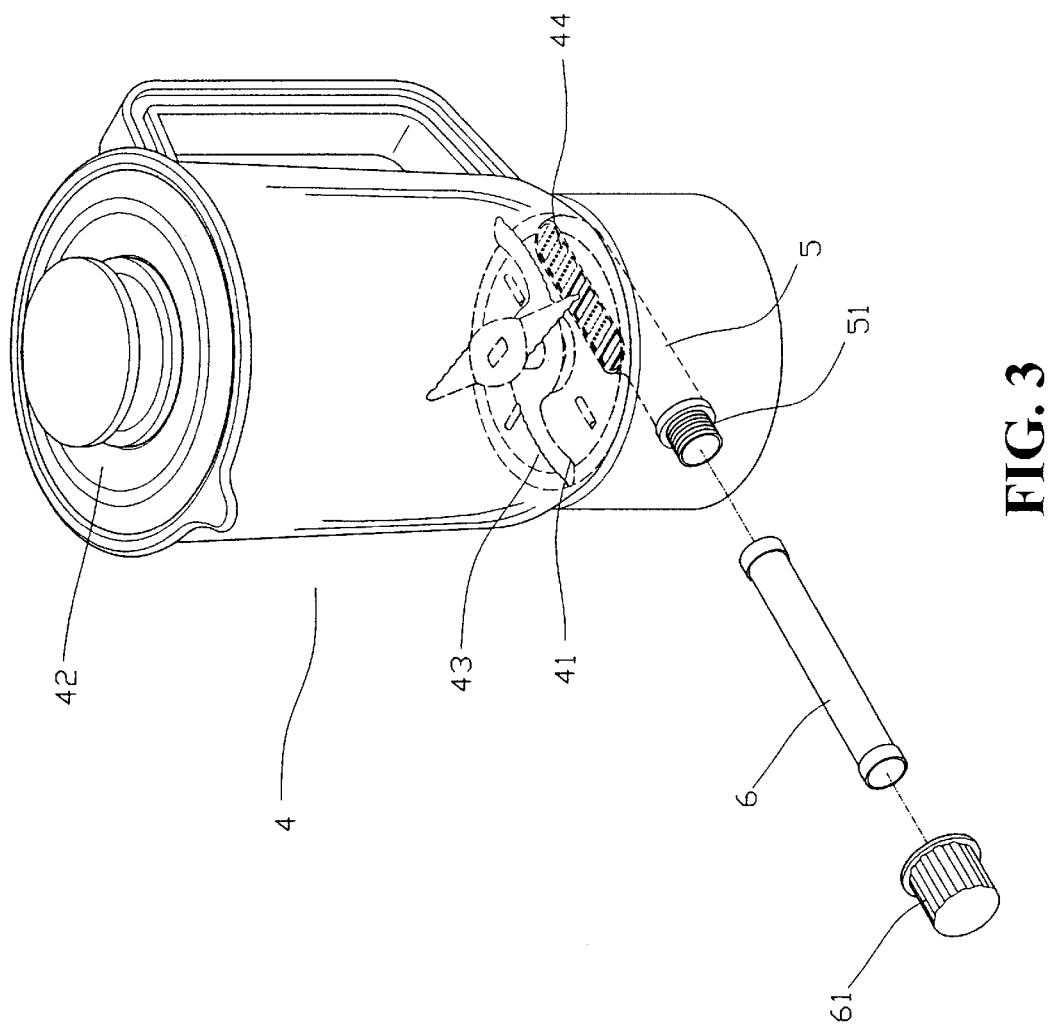
FIG. 3 is a preferred embodiment of a fruit and vegetable processor in accordance with the present invention.

Referring to FIG. 3, the bottom plate 43 of the cup body 4 is formed with one side being slanting, and the lower side of the bottom plate 43 is provided with a plurality of spaced apart through holes 44. The lower section of the through hole 44 is a hollow passage 5. In a preferred embodiment one end of the passage 5 is protruded at one side of the cup body 4 to form a connector 51 for the plug-in of a plugging element into the passage 5. The plugging element is a block body 6 and the shape of the block body 6 is corresponding to that of the passage 5, and the outer side surface is sealed. A plug 61 having a sealed face at one end is connected to the connector 51. Due to the fact that the block body 6 is plugged into the passage 5, and there are through holes 44 on the slanting side of the bottom plate 43, under the covering of the block body 6, the through hole 44 is completely sealed. In addition, the connector 5 is combined with a plug 61, therefore a good plugging effect is obtained. Thus, when food stuff requiring no filtering is minced, the top cover 42 is lifted up to place food stuff for mincing, the liquid food stuff is poured from the cup body 4 for consumption.

Figure 4:
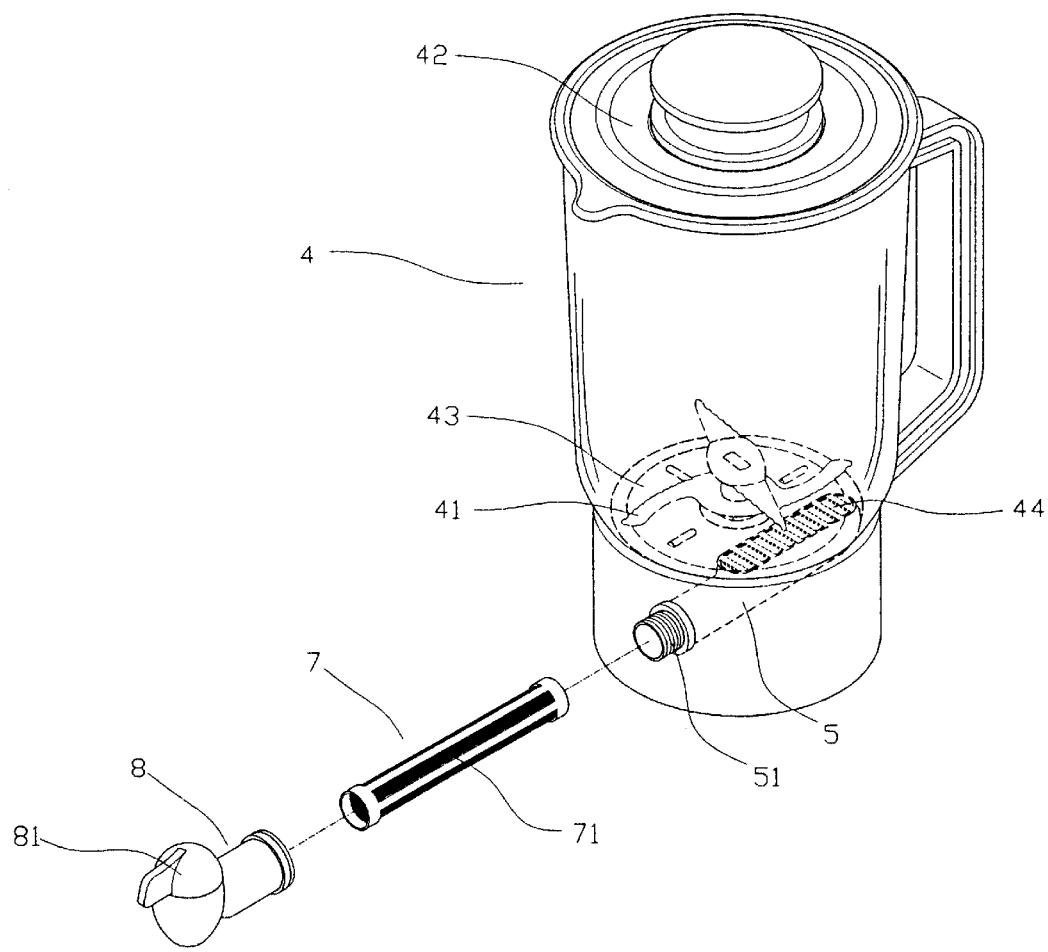
FIG. 4 is another preferred embodiment of a fruit and vegetable processor in accordance with the present invention.

Referring to FIG. 4, the plugging element is a filtering body 7 having a shape corresponding to that of the passage 5. The outer circumferential surface is provided with a filter 71, and the connector 51 is connected to an output element 8 having mounted with a valve 81 at the outlet for the smooth controlling of the outlet.

Due to the fact that the passage 5 is provided with a filter body 7 having a filter 71, the through hole 44 and the filter body 7 is smooth. When peas or beans after mincing is to be filtered, due to the slanting bottom plate 43, juice with residue will flow to that side and pass through the passage 5 via the through hole 44. As there is filter 71 at the surrounding of the filter body 7, only juice can pass through and residue is blocked at the cup body 4. Juice will flow through the filter 71 to the filter body 7 and the valve 81 is rotated to smooth the outlet of the output mechanism 8. Juice will flow out of the output mechanism 8, and the cup body 4 may not be removed to provide the juice.

The advantage of the present invention is the provision of a passage 5 which can be plugged with a plugging element, so that liquid product does not need filtering but the blocking tube 6 is inserted into the passage if the product (minced product) within the cup body 4 needs to be filtered, the filter body 7 is inserted at the passage 5. Thus, without replacing the entire cup body, but only replacing the blocking tube 6 or the filter 7, the required product from the processor is obtained.

Another advantage is that the replacement of the blocking tube or the filter is simple, and the number of the cup body is reduced which also reduce the cost of manufacturing. Further, the entire packaging size is small, which save space during shipping or transporting.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A fruit and vegetable processor having a base seat mounted with a cup body, a motor being installed within the base seat and a lower side of the interior of the cup body being axially mounted with a tool kit driven by the motor to rotate and stir and mince food stuff, a top side of the cup body being an opening covered with a top cover, and a bottom plate of the cup body inclined at one side, characterized in that a lower side of the bottom plate is provided with a plurality of spaced apart through holes and the lower section of the through holes is formed into a hollow passage for the insertion of a plugging element into the passage.

2. The processor of claim 1, wherein the plugging element is a blocking body having a shape corresponding to the passage and having an external circumferential face being sealed.

3. The processor of claim 1, wherein the plugging element is a filtering body having a shape corresponding to the passage and an outer circumferential surface being provided with a filter.

* * * * *